(12) United States Patent
Kemme et al.

(10) Patent No.: US 10,254,112 B1
(45) Date of Patent: Apr. 9, 2019

(54) FULL-FIELD SURFACE ROUGHNESS

(71) Applicant: National Technology & Engineering Solutions of Sandia, LLC, Albuquerque, NM (US)

(72) Inventors: Shanalyn A. Kemme, Albuquerque, NM (US); Adam Jones, Tijeras, NM (US); George Burns, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 0 days.

(21) Appl. No.: 14/927,037

(22) Filed: Oct. 29, 2015

(51) Int. Cl.
*G01B 11/30* (2006.01)
*G06T 5/10* (2006.01)

(52) U.S. Cl.
CPC .............. *G01B 11/303* (2013.01); *G06T 5/10* (2013.01)

(58) Field of Classification Search
CPC ................................. G01B 11/303; G06T 5/10
USPC ................ 356/600–624, 328, 450, 486
See application file for complete search history.

(56) References Cited

U.S. PATENT DOCUMENTS

| 2005/0041229 A1* | 2/2005 | Meisburger | G03F 7/70216 355/53 |
|---|---|---|---|
| 2005/0280793 A1* | 12/2005 | Sumi | G03B 27/54 355/67 |
| 2006/0007436 A1* | 1/2006 | Kurosawa | G01N 21/47 356/237.4 |
| 2009/0059336 A1* | 3/2009 | Dunphy | G02B 26/008 353/33 |
| 2009/0141327 A1* | 6/2009 | Penn | G02B 26/125 359/201.1 |
| 2009/0273793 A1* | 11/2009 | Fukuda | G03F 7/2053 356/614 |
| 2013/0016362 A1* | 1/2013 | Gong | G01B 11/2527 356/610 |

OTHER PUBLICATIONS

Harvey, et al., "Total Integrated Scatter from Surfaces with Arbitrary Roughness, Correlation Widths, and Incident Angles", Optical Engineering, vol. 51(1), Jan. 2012—pp. 1-12, 2012.
Vorburger, et al., "Surface Finish Metrology Tutorial", United States Department of Commerce, pp. 1-162, Jun. 1990.
(Continued)

*Primary Examiner* — Isiaka O Akanbi
(74) *Attorney, Agent, or Firm* — Medley, Behrens & Lewis, LLC (57) ABSTRACT

The various embodiments presented herein relate to utilizing light in conjunction with an optical Fourier transform to examine and quantify roughness of a surface. The surface includes a plurality of flaked particles. The surface is illuminated with a light beam, wherein light reflected from the surface passes through an f-theta lens and is collected at a light sensitive array (LSA). The LSA comprises light sensitive pixels. For an arrangement where the flakes are conformal with the surface, a low degree of light scattering occurs at the surface. For a surface comprising tipped and/or tilted flakes, a correlating degree of scattering of the incident light beam occurs. The surface roughness is quantified based upon the distribution of angular reflections of the scattered light represented in an image formed through use of the LSA.

18 Claims, 9 Drawing Sheets

(56) References Cited

OTHER PUBLICATIONS

Vorburger, Ted, "Optical Methods of Surface Measurement", Measurement Science and Standards in Forensic Firearms Analysis 2012, NIST, pp. 1-26, Jul. 2012.
Lukianowicz, et al., "Optical System for Measurement of Surface Form and Roughness", Measurement Science Review, vol. 1, No. 1, pp. 151-154, 2001.

* cited by examiner

910
POSITIONING A SURFACE WITH RESPECT TO A FOCAL LENGTH OF A F-THETA LENS, WHEREIN THE SURFACE INCLUDES AT LEAST ONE PARTICLE AND THE F-THETA LENS IS POSITIONED BETWEEN THE SURFACE AND A LIGHT SENSING ARRAY

920
ILLUMINATING THE SURFACE WITH A LIGHT BEAM

930
CAPTURING, AT THE LIGHT SENSING ARRAY, LIGHT REFLECTED FROM THE AT LEAST ONE PARTICLE

940
DETERMINING AT LEAST ONE OF TIP AND/OR TILT FOR THE AT LEAST ONE PARTICLE RELATIVE TO THE SURFACE

FULL-FIELD SURFACE ROUGHNESS

STATEMENT OF GOVERNMENTAL INTEREST

This invention was developed under contract DE-AC04-94AL85000 between Sandia Corporation and the U.S. Department of Energy. The U.S. Government has certain rights in this invention.

BACKGROUND

Roughness of a surface can be quantified by measuring deviations in a direction of a normal vector of a surface from an ideal form. If the deviations are small, then the surface is considered to be smooth, while if the deviations are large, then the surface is considered to be rough. Measuring roughness of a surface can include such techniques as profilometry (e.g., in the micrometer realm) and further, atomic force microscopy (e.g., in the nanometer realm).

SUMMARY

The following is a brief summary of subject matter that is described in greater detail herein. This summary is not intended to be limiting as to the scope of the claims.

Various embodiments presented herein relate to utilizing light in conjunction with an optical Fourier transform to examine and quantify a roughness (e.g., full field roughness) of a surface (e.g., of a reflective surface).

In an embodiment, roughness of a surface of a target is to be quantified, where (reflective) flakes or other particles have been applied to the surface of the target. In some cases it may be desirable for the flakes to be conformal with the surface of the target, while in other cases it may be desirable for the flakes to be somewhat misaligned relative to the surface of the target (e.g., have degrees of tip and/or tilt relative to the surface of the target). In connection with quantifying surface roughness, a light source illuminates a portion of the surface of the target with a light beam, wherein light incident upon the portion of the surface is reflected therefrom. The reflected light passes through a lens and is collected at a light sensitive array (LSA) (e.g., a focal plane array (FPA)), which comprises a plurality of light sensitive pixels. The reflected light will exhibit a degree of scattering that is correlated to degrees of tip and/or tilt of the flakes relative to surface plane of the target. For example, when the flakes are conformal with the surface, e.g., the flakes are aligned parallel to the surface plane of the surface, the reflected light exhibits a low degree of scattering. In another example, when the flakes are misaligned with respect to the surface (e.g., the flakes have a degree of tip and/or tilt), the reflected light exhibits a higher degree of light scattering compared to the degree of light scattering exhibited by the reflective light when the flakes are conformal with the surface.

As noted above, the reflected light is focused by the lens towards the LSA. As the number of misaligned flakes (misaligned relative to the surface plane) in the portion of the surface illuminated by the light source increases, and as the degree of tip and/or tilt increases, a size of the footprint on the LSA where the reflected light is detected increases (e.g., a number of pixels over which the reflected light is distributed increases). An image is formed based upon intensities of light detected at the pixels. Based upon the number of pixels being illuminated and/or intensity of light incident upon each pixel, a quantification can be made with regard to the surface roughness of the target, e.g., based upon the angular distribution of rays in the reflected light (where the angular distribution is caused by scattering). For example, for a flat mirror surface the image will depict a focused point that corresponds to the reflected light, while for a diffuse reflection the image will depict a broader region.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Various technologies pertaining to determining roughness of a surface are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s)

may be practiced without these specific details. In other instances, well-known structures and devices are shown in block diagram form in order to facilitate describing one or more aspects.

Further, the term "or" is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Additionally, as used herein, the term "exemplary" is intended to mean serving as an illustration or example of something, and is not intended to indicate a preference.

Figure 1:
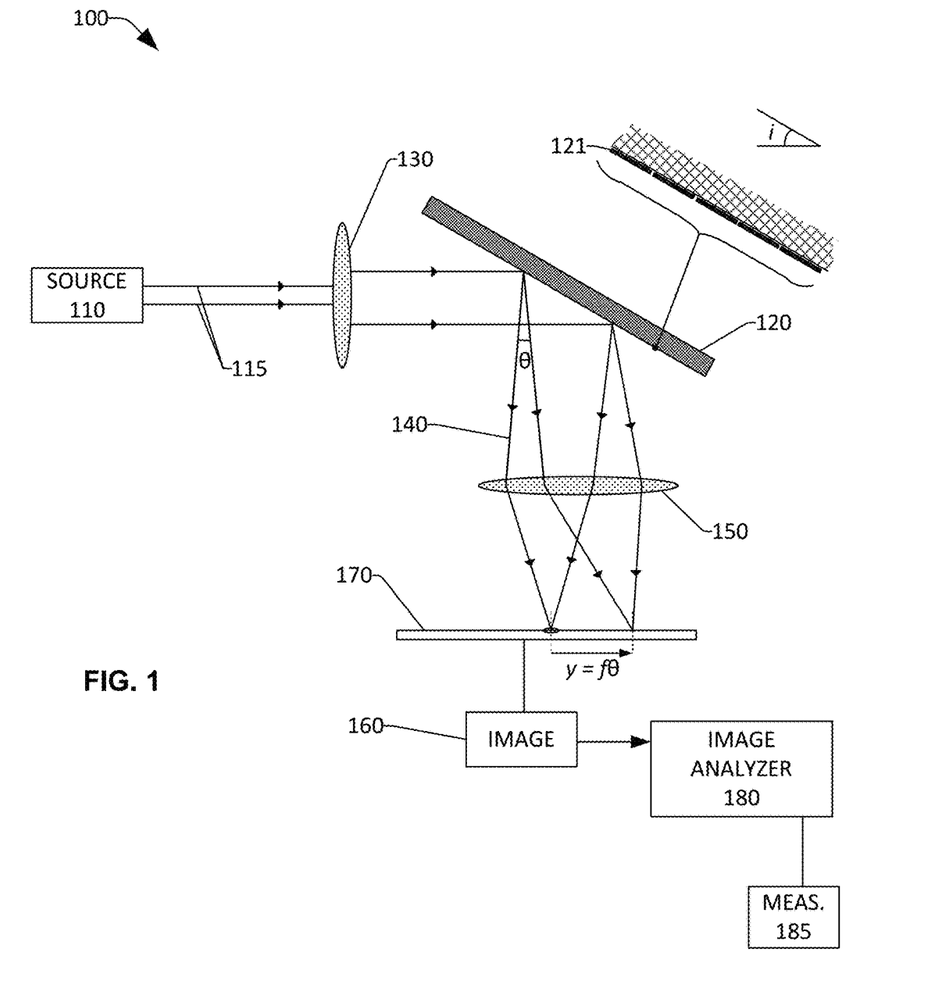
FIG. 1 illustrates a system utilizing an optical Fourier transform to quantify a surface roughness, in accordance with an embodiment.

Various embodiments presented herein relate to utilizing light (e.g., collimated light) in conjunction with an optical Fourier transform to examine and quantify a roughness (e.g., full field roughness) of a surface (e.g., of a reflective surface). FIG. 1 illustrates a system 100 which can be utilized to quantify roughness of a surface. The system 100 comprises a light source 110 that can be utilized to generate light 115 (e.g., beams of light), wherein the light 115 can be directed towards a surface 120 of a target. The surface 120 can have a plurality of flakes (facets, particles, flattened particles, etc.) 121 adhered thereto, wherein the flakes 121 can be aligned to varying degrees with respect to the surface 120. For example, the flakes 121 can reside in the same plane as the surface 120, with the surface 120 and flakes 121 being considered as having a high coherence. The light source 110 and/or the surface 120 can be positioned relative to one another such that an angle i defined by the surface 120 with regard to the direction of the light 115 is as desired (e.g., to adjust a reflectivity of the surface 120 with respect to the light 115).

As further described herein, for a surface 120 exhibiting light scattering, the flakes 121 may not be aligned in the same plane as the surface 120, and rather, the flakes 121 have varying degrees of tip and/or tilt relative to the surface and an according incoherent reflectivity. Tip can be considered to be an angle of incline of a flake 121 (or surface) with respect to a surface plane of surface 120, while tilt can also be considered to be an angle of incline of a flake 121 with respect to a surface plane of surface 120 but in a direction orthogonal to the tip direction.

In an embodiment, the light 115 can be collimated. Accordingly, to further collimate the light 115 beyond a degree of collimation with which the light 115 is generated at the light source 110, the system 100 can optionally include a collimating lens 130, which can be located in the path of light 115 such that the light 115 incident upon the surface 120 has a desired degree of collimation. The surface 120 and/or the flakes 121 can be reflective such that the light 115 (subsequent to passing through the collimating lens) is reflected from the surface 120. The system 100 also includes an f-theta lens 150 that is positioned relative to the surface 120 such that the reflected light 140 is incident upon the f-theta lens 150. The f-theta lens 150 is designed to have a flat focal plane. This avoids a position dependent defocus, and therefore avoids error in estimating the angular distribution of light rays in the reflected light 140. The system 100 also comprises a light sensitive array (LSA) 170 that is positioned relative to the f-theta lens 150 such that light exiting the f-theta lens 150 is incident upon at least a portion of the LSA 170. More specifically, the f-theta lens 150 can cause the reflected light 140 to be focused upon the LSA 170 (aka a focal plane array (FPA)). While not shown, the LSA 170 can include or be in communication with readout electronics and other circuitry, which can be configured to form an image 160 based upon intensity of the light captured at pixels of the LSA 170. The image 160 includes a region that represents locations on the LSA 170 where the reflected, focused light is incident upon the LSA 170.

The system 100 further includes an image analyzer 180 in communication with the LSA 170, where the image analyzer can be configured to analyze one or more properties of the image 160 to determine a degree of light scattering that the flakes 121 on the surface 120 impart upon the incident light 115. Example properties include, but are not limited to, a number of pixels in the region of the image 160, a height of the region in the image 160 (e.g., a number of pixels in the region in an x direction), a width of the region in the image 160 (e.g., a number of pixels in the region in a y direction), intensity values of pixels in the region, a location in the image 160 of a centroid of the region, and distribution of intensity values of the pixels in the region. In an example, the image analyzer 180 can identify the region in the image 160 through use of thresholds and clustering. For instance, the image analyzer 180 can compare intensity of each pixel to a predefined threshold value, and can discard pixels with intensities beneath the threshold. For any remaining pixels, the image analyzer component 180 can discard pixels that are not within a predefined number of pixels from at least one other non-discarded pixel. The image analyzer 180 can further determine a surface roughness measure 185 for the surface 120 (with the flakes 121 adhered thereto) based upon the degree of light scattering. This surface roughness measure 185 can be indicative of conformality of the flakes 121 to each other and the surface 120. In an example, the image analyzer 180 can compute a value that is indicative of distribution of tip and/or tilt of the flakes 121 relative to the surface plane of the surface 120. For example, over an area of 10 in$^2$, the image analyzer 180 can compute a value that indicates that 20% of the flakes 121 on surface 120 are within a tip/tilt range of 0° to about 20°.

From the above, it can be ascertained that the image analyzer 180 can be implemented as an integrated circuit that is configured to perform the functions described above, as a processor that is programmed with instructions for performing the functions described above, as a field programmable gate array (FPGA) that is programmed with instructions for performing the instructions described above, etc. Further, while the image analyzer 180 has been described as determining the surface roughness measure 185, in another exemplary embodiment, the system 100 can comprise a display (not shown), where the image 160 is shown on a display and a reviewer can infer the surface roughness measure 185 through visual analysis of the image 160.

Additional, exemplary information pertaining to the elements of the system 100 is now set forth. The light source 110 can be any suitable component such as a laser, wherein selection of the light source 110 can be based in part upon a wavelength of the light 115 at which the surface 120 and/or flakes 121 is reflective. For example, the light source 110 can be a helium-neon (HeNe) laser which generates light with a wavelength of about 633 nanometers (nm).

As indicated previously, the f-theta lens 150 can optionally be designed to have a flat focal plane. In another embodiment, the LSA 170 can be placed at a distance from the f-theta lens that is equivalent to or close to the focal length of the f-theta lens 150. Further, the LSA 170 can be a charge-coupled device (CCD), a complementary metal oxide semiconductor (CMOS) device, or the like.

FIGS. 2A-4B depict a LSA 170 comprising a plurality of pixels A1-K11, wherein regions 260, 360, and 460 of illumination (e.g., formed by the reflected light 140 focused by the f-theta lens 150) are respectively depicted. It is to be appreciated that while the LSA 170 (and accordingly the image 160) is depicted as comprising 121 pixels (e.g., A1-K11), the LSA 170 can be an M×N array of pixels, where M and N are positive integers greater than zero. The respective regions 260, 360 and 460 are based upon respective surfaces 220, 320, and 420 (e.g., similar to surface 120) having different orders of surface irregularity (magnitudes of roughness, light scattering, differing degrees of tip and/or tilt), as further described. The surface 220 has a higher degree of flatness than surface 320, and surface 320 has a higher degree of flatness than surface 420. Alternatively, in terms of roughness, surface roughness of surface 420>surface roughness of surface 320>surface roughness of surface 220.

Figure 2A:
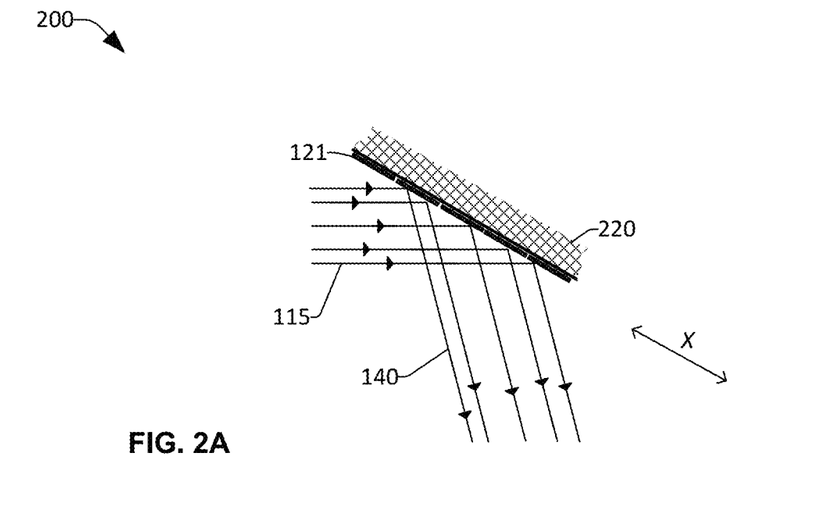
FIG. 2A illustrates a conformal surface being illuminated by a light beam.
Figure 2B:
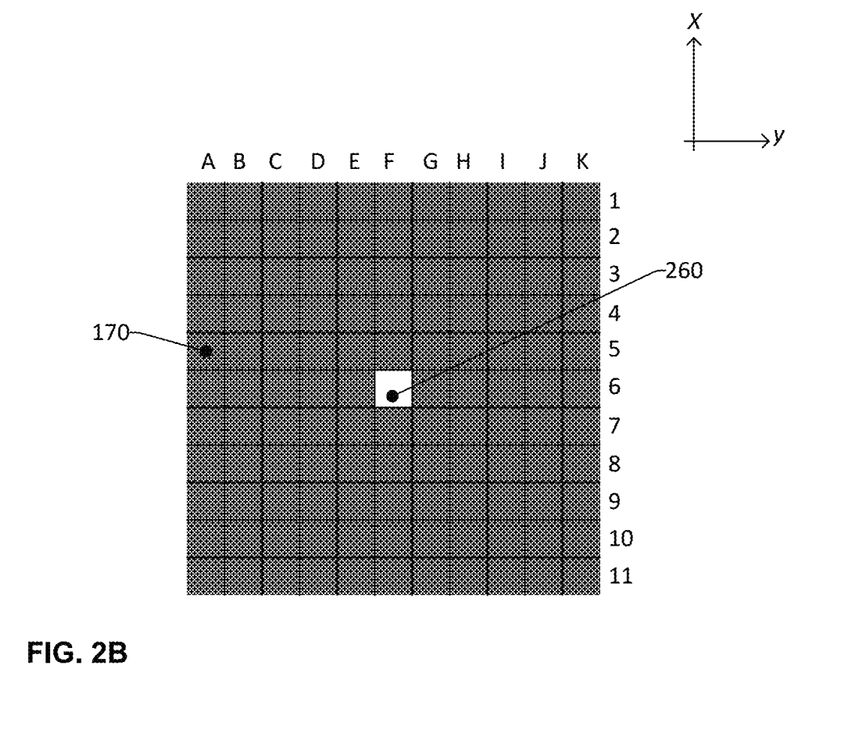
FIG. 2B illustrates an image being formed on a light sensitive array, the light being reflected by the conformal surface.

FIGS. 2A and 2B depict a condition 200 where the surface 220 has a very high degree of flatness (e.g., highly reflective), with the flakes 121 being substantially aligned to the plane of surface 220. Accordingly, as shown in FIG. 2B, owing to the highly coherent surface being formed by the flakes 121, the reflected light 140 is focused by the f-theta lens 150 onto a single pixel, F6 (such that, in the image 160, the region 260 is represented by a single pixel with relatively high intensity).

Figure 3A:
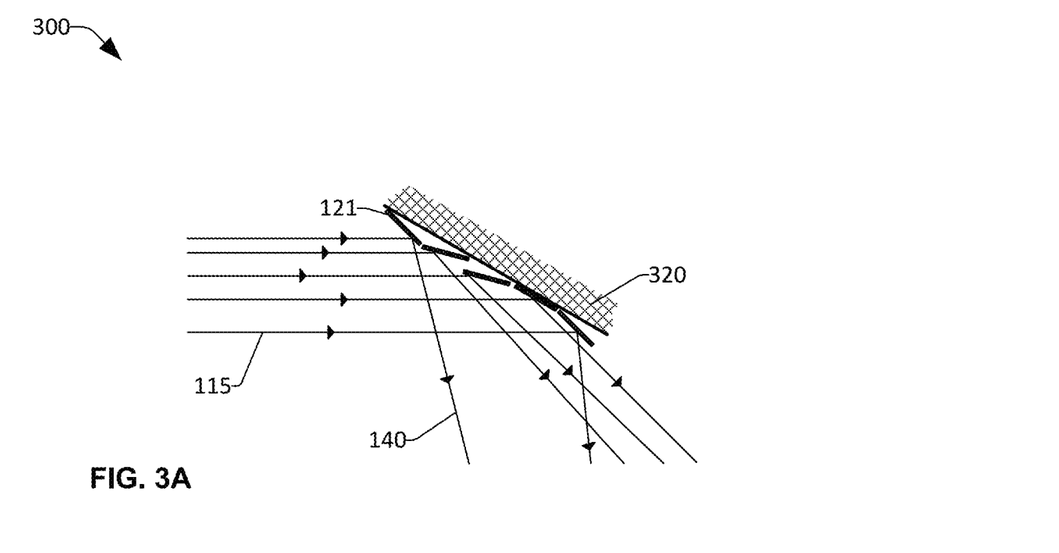
FIG. 3A illustrates a moderately conformal surface being illuminated by a light beam.
Figure 3B:
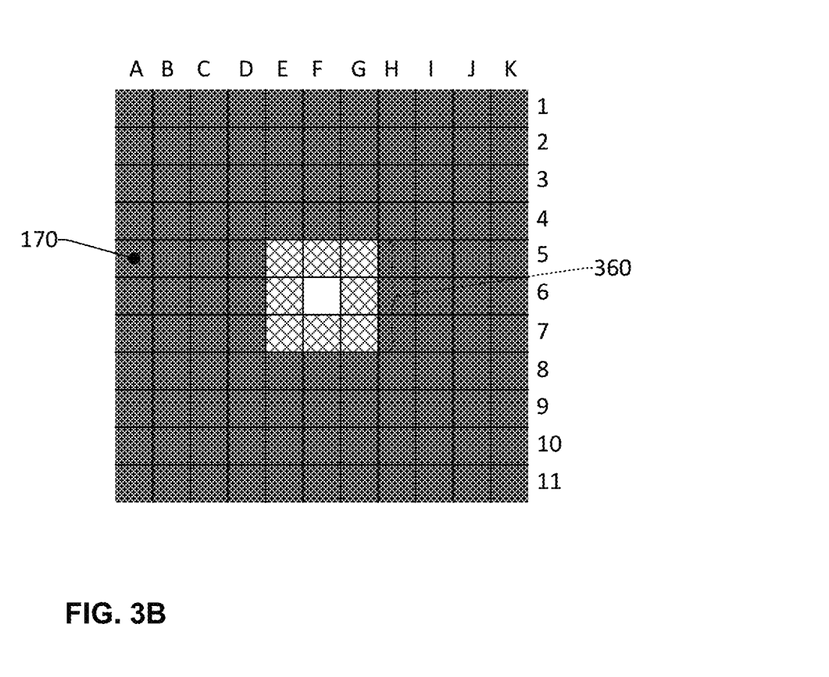
FIG. 3B illustrates an image being formed on a light sensitive array, the light being scattered from the moderately conformal surface.

FIGS. 3A and 3B depict another condition 300, wherein the flakes 121 have a moderate degree of tip and/or tilt resulting in the surface 120, when the flakes 121 are adhered thereto, having a moderate flatness. The resulting scattering of the reflected light 140 can cause the region 360 to be spread out (e.g., compared to the region 260 shown in FIG. 2B) over a number of pixels, e.g., E5-E7, F5-F7, and G5-7. As depicted, the pixel F6 may have a majority of reflected light 140 incident upon it, while pixels E5-7, F5, F7, and G5-7 receive a lower intensity of reflected light, as depicted by the ghosting around pixel F6, such that region 360, when represented in the image 160, appears to be blurred, or less sharp, than the region 260 in the image 160.

Figure 4A:
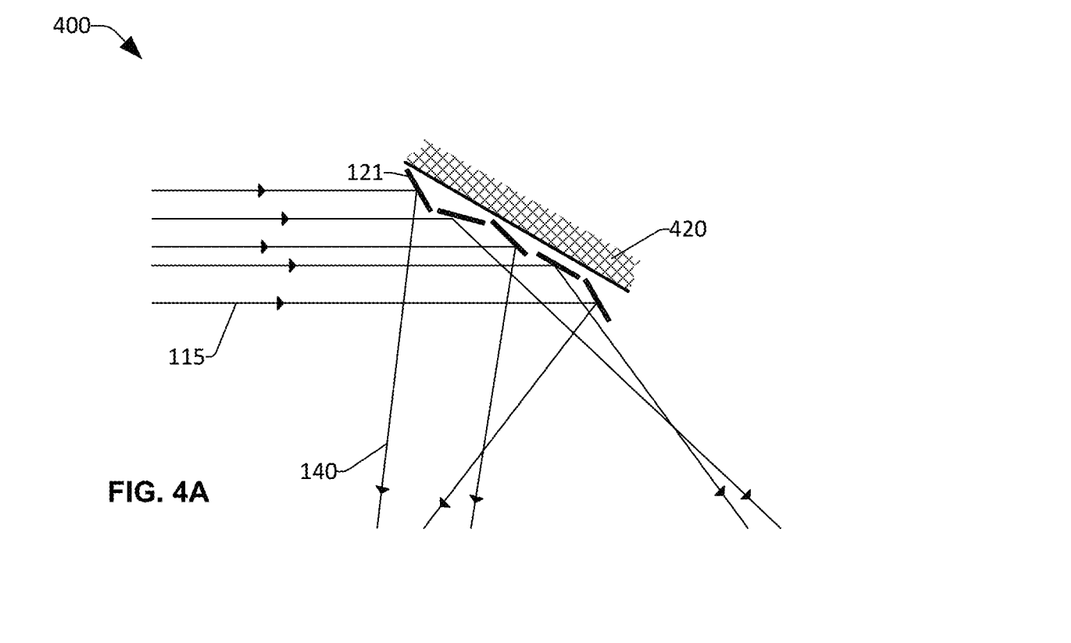
FIG. 4A illustrates a non-conformal surface being illuminated by a light beam.
Figure 4B:
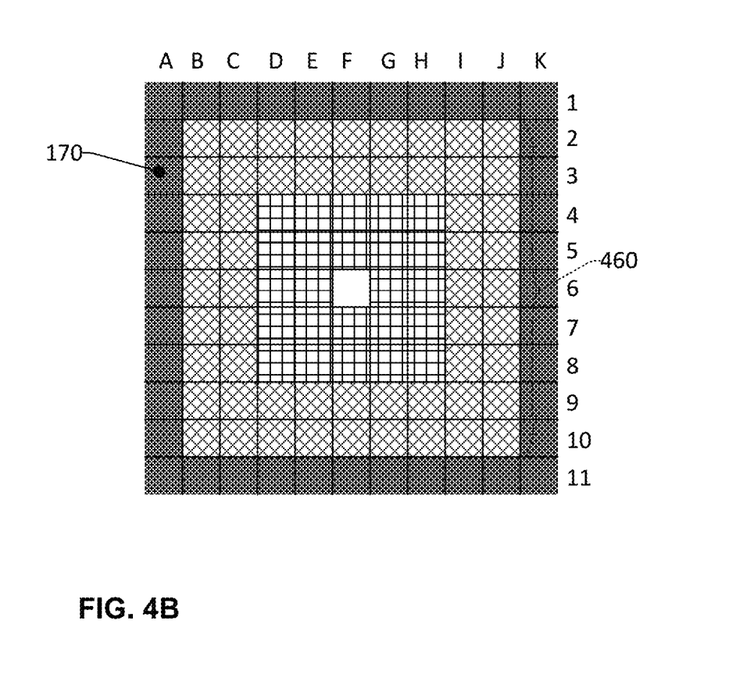
FIG. 4B illustrates an image being formed on a light sensitive array, the light being scattered from the non-conformal surface.

FIGS. 4A and 4B depict a further condition 400, wherein the surface 420, when the flakes 121 are adhered thereto, has a poor degree of flatness owing to flakes 121 having a respectively high range in degree of tip and/or tilt (e.g., compared with conditions 200 and 300). The resultant scattering of the reflected light 140 can cause the region 460 to be spread out (e.g., blurred) over a number of pixels, e.g., B2-B10 through to J2-J10. As depicted, the pixel F6 may have a majority of reflected light 140 incident upon it, while pixels D4-D8, E4-E8, F4, F5, F7, F8, G4-G8, and H4-H8 receive a lower intensity of reflected light, as depicted by the ghosting around pixel F6, and further, pixels B2-B10, C2-C10, D2, D3, D9, D10, E2, E3, E9, E10, F2, F3, F9, F10, G2, G3, G9, G10, H2, H3, H9, H10, I2-I10, and J2-J10 receive even less light such that region 460, when represented in the image 160, appears to be blurred, or less sharp, than the regions 260 and 360 when represented in the image 160.

It is to be appreciated that a central pixel F6 is depicted in FIGS. 2B, 3B and 4B as receiving the highest intensity of reflected light 140. However, a situation can occur where the roughness (e.g., alignment of facets 121) exhibits a degree of bias in either x and/or y directions (e.g., a nonzero mean), which can cause a center of a spot distribution to be physically shifted in accordance with the direction of the bias. Hence, pixel F6 no longer receives a majority of reflected light 140, and rather, a non-central pixel in LSA 170 has the highest intensity of light incident upon it.

The following provides further information regarding the various concepts and embodiments presented in FIGS. 1-4B, and propagation of a field through a lens.

A propagating beam at some point in space can be represented by a superposition of an infinite number of plane waves to form an optical field (e.g., comprising light 115 and/or reflected light 140), per Eqn. 1:

$$E(x, y, z = 0) = \int\int E(\alpha, \beta)\big|_{z=0} e^{i(\alpha x+\beta y)} \quad \text{Eqn. 1}$$
$$e^{i\sqrt{k^2-\alpha^2-\beta^2}} \, d\alpha d\beta$$
$$= \mathcal{F}\{E(\alpha, \beta)|_{z=0}\}$$

where α and β are direction cosines along respective x and y directions and $k=2\pi/\lambda$ is the spatial frequency of the field. In the foregoing, it is assumed that the field is a monochromatic field. Per Eqn. 1, the field, as a function of position and its angular spectrum, comprises a Fourier transform pair.

As a field propagates over a "large" distance (~$D^2/\lambda$, where D is the diameter of a lens, e.g., f-theta lens 150), it can be considered to be in the "far field" with a radiation pattern well approximated by the Fourier transform of the radiation pattern at z=0. The function of a lens (e.g., f-theta lens 150) can be thought of as moving the radiation pattern at z=∞ to the focal point of the lens (e.g., z=f), which enables an intensity at the focal point of the lens (e.g., f-theta lens 150) to be defined per Eqn. 2:

$$I^{img}(x, y) = \frac{1}{(\lambda f)^2}\left|\mathcal{F}\left\{E^{obj}\left(\frac{x}{\lambda f}, \frac{y}{\lambda f}\right)\right\}\right|^2 \quad \text{Eqn. 2}$$

Per the images presented in FIGS. 2B, 3B, and 4B, the f-theta lens 150 can be positioned relative to the LSA 170 such that for a highly conformal surface 120, under an optimal condition, the reflected light 140 is focused on a single (e.g., central) pixel, as depicted in FIG. 2B with only pixel F6 receiving the reflected light 140.

Derivation of Eqn. 2 indicates that a magnitude of the intensity in the image plane (e.g., LSA 170) at a point (e.g., a point at x, y, such as pixel F6) is directly proportional to a magnitude of the Fourier coefficient of the corresponding spatial frequency in the object plane given by ($\alpha=x/\lambda f$, $\beta=x/\lambda f$). Normalizing this result by the total intensity in the image plane yields a joint probability density function on α and β, per Eqn. 3:

$$p_{\alpha\beta}(x, y) = \frac{I^{img}(x, y)}{\int\int I^{img}(x, y)dxdy} \quad \text{Eqn. 3}$$

If a system (e.g., configurations 200, 300, or 400) exhibits rotational symmetry, a radius in the image plane can be defined as $\rho^2=x^2+y^2$. Accordingly, the joint probability density expressed in Eqn. 3 can be reduced, per Eqn. 4:

$$p_\theta(\rho) = \frac{I^{img}(\rho)}{\int I^{img}(\rho) d\rho} \qquad \text{Eqn. 4}$$

Hence, a probability that the spatial frequency of the input field falls within the range $\theta \pm d\theta$ can be written per Eqn. 5:

$$P(\theta - d\theta < \theta < \theta + d\theta) = \int_{\theta - d\theta}^{\theta + d\theta} p_\theta(\rho) d\theta \qquad \text{Eqn. 5}$$

Thus, correlating concepts presented in Eqns. 1-5 with the various configurations presented in FIGS. 1-4B, collimation of the beam 115 can create a closest approximation to a plane wave that can be achieved with the system 100. The collimation of beam 115 can result in a superposition of plane waves, but having a very narrow angular spectrum.

When a rough surface (e.g., a surface 320, 420) is placed in a collimated space (e.g., illuminated by the collimated beam 115), each facet (e.g., flakes 121) on the surface can effectively change an angular spectrum of the field incident on a scatterer (e.g., respective alignment of facets 121) by a constant factor ($\theta_{out} = \theta_{in} + \theta_{facet}$), which can result in a broadening of an intensity distribution in an image plane (e.g., for specular reflection). The broadening of intensity distribution is depicted in FIGS. 3A-4B.

If a source of an illumination (e.g., beam 115) were a perfect plane wave, a spot would correspond solely to an angular distribution of a surface (e.g., surface 120 and flakes 121) being illuminated by the light source 110. However, the light source 110 (and a light beam generated therefrom) can have its own angular distribution. This can result in an image intensity which represents a convolution of the angular spectrum of the source 110 and also that of the surface being illuminated by the source 110. The interaction between the angular spectrum of the source 110 and that of the surface can be expressed per Eqn. 6:

$$I^{img}(\rho) = \int I^{source}(\rho') * I^{surface}(\rho - \rho') d\rho \qquad \text{Eqn. 6}$$

The transfer functions of both components can be approximated by Gaussian distributions having zero mean, a resulting image intensity can be a broadened version of the transfer function of the surface with variance given by $\sigma_{img}^2 = \sigma_{source}^2 + \sigma_{surface}^2$. Hence, the respective broadening of spots 360 and 460 with respect to spot 260.

While accounting for the distribution of the source requires deconvolution of the image and source signals, if the measured data is well approximated by a Gaussian distribution, the statistical nature of that distribution allows for extremely simple calibration of the result.

Per the foregoing, any of the following observable phenomena can be engendered: (a) in a configuration where the source distribution is sufficiently narrow, the spot intensity can approximate the density of the surface roughness to a high degree; (b) in a configuration where the surface roughness exhibits some bias in either x or y (e.g., a nonzero mean), the center of the distribution of the spot will be physically shifted in the bias direction; (c) in a configuration where the field of view of the f-theta lens 150 can limit the maximum capturable angles, clipping of the transfer function may result, and further, a normalization value used to generate the probability density function may be impacted. Account is to be made to minimize a degree of error introduced into the measurement of the probability that the surface angle is within a given range; (d) in a configuration where the angular spread in the x direction is different than that in the y direction, the result will be an elliptical image with major and minor axes along the respective x and y directions; and (e) in a configuration where the angular spread in the x direction and the y direction are different and the major and minor axes are not along the x and y directions, this can indicate that the angular distributions on x and y are correlated (i.e., there is some dependence of the tilt in y on the tilt in x and vice-versa).

Figure 5:
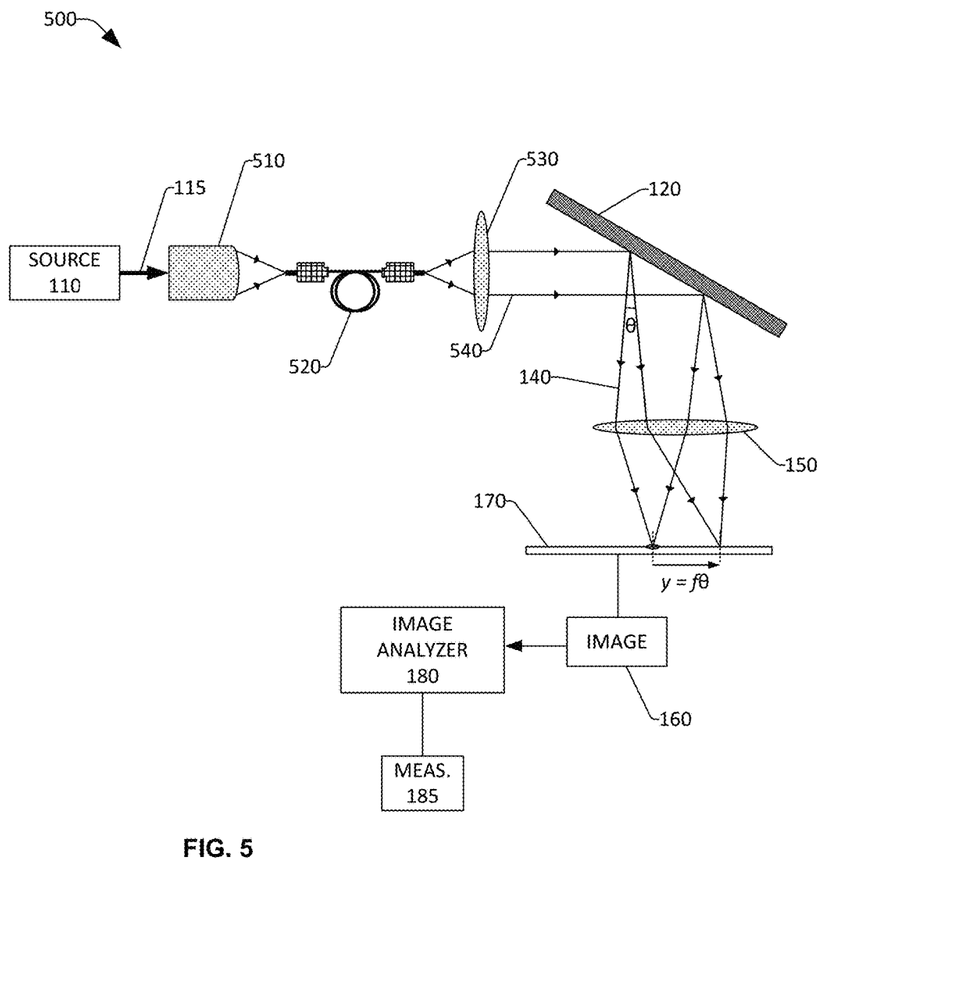
FIG. 5 illustrates a system utilizing a single mode fiber and lens positioned to collimate light utilized in an optical Fourier transform to quantify a surface roughness, in accordance with an embodiment.

As previously mentioned, light incident upon a surface can be collimated. Light from a light source 110 has an inherent collimation, which can be further improved by passing the light through a single mode fiber. FIG. 5 illustrates a system 500 which comprises components common to the components presented in system 100, FIG. 1. System 500 further includes an objective lens 510 which can focus the light 115 upon a single mode fiber 520, wherein the collected light within the fiber will propagate as a single mode. The single mode light 540 exiting from the fiber 520 can subsequently pass through a lens 530 (e.g., a collimating lens equivalent to lens 130) to direct the collimated light 540 to illuminate a sample 120.

Figure 6A:
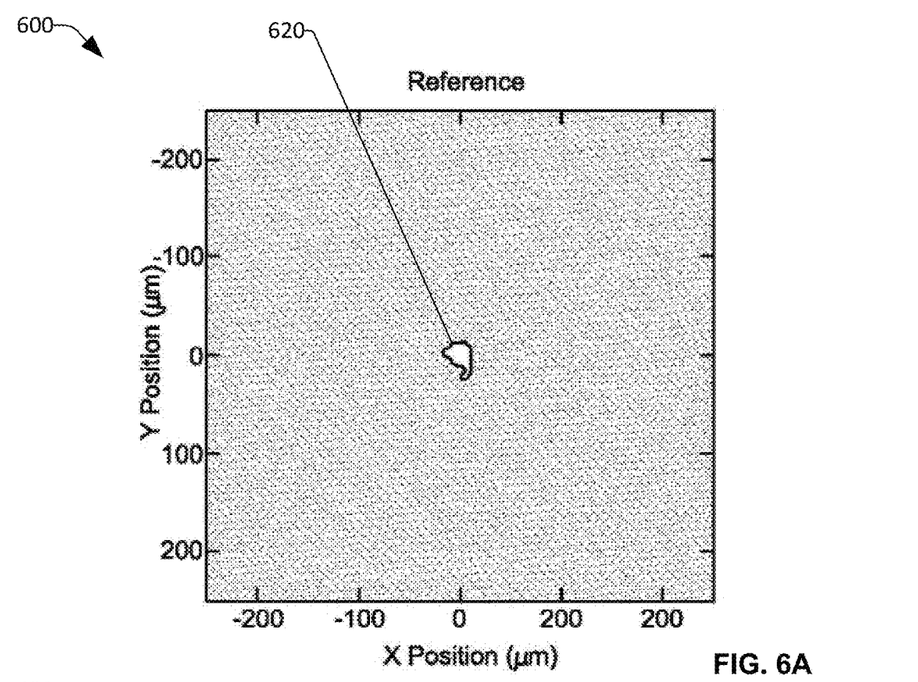
FIG. 6A is an image formed at the light sensitive array from light scattered by a conformal surface.
Figure 6B:
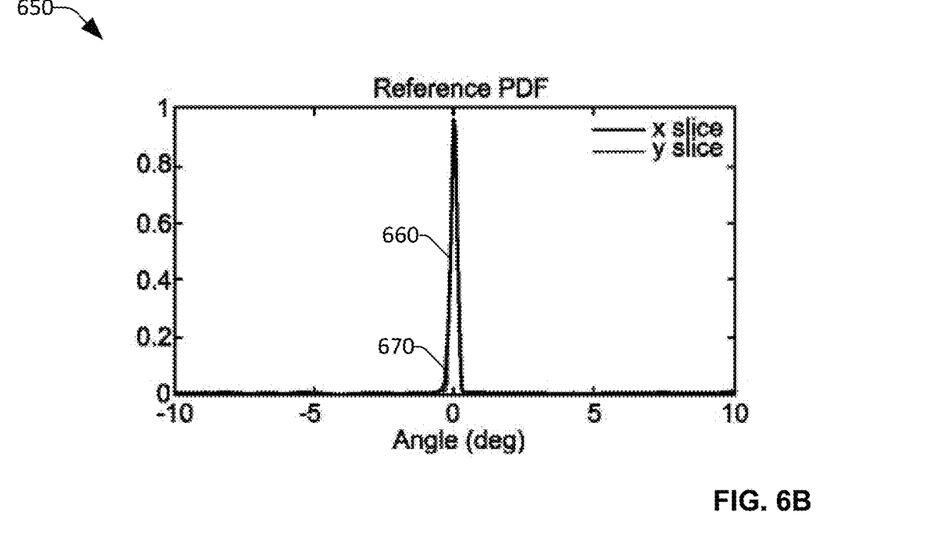
FIG. 6B is a plot of angular distribution of light for an image formed at the light sensitive array from light scattered by a conformal surface.

FIGS. 6A-6B, 7A-7B, and 8A-8B present examples of images (e.g., images 160) being captured at an LSA 170 and subsequent roughness determinations (e.g., measures 185). FIG. 6A illustrates an image 600 generated for a sample wherein the surface (e.g., surface 220) has a high degree of conformality between the flakes (e.g., flakes 121), per the tight cluster of pixels (e.g., 3×3) being illuminated. As shown in FIG. 6B, plot 650, analysis of the intensity distribution in both the x direction (plot 660) and the y direction (plot 670) of the pixels in illuminated region 620 indicates an angle of tip and/or tilt of the flakes 121 illuminated by the light 115 of about ±0.5°.

Figure 7A:
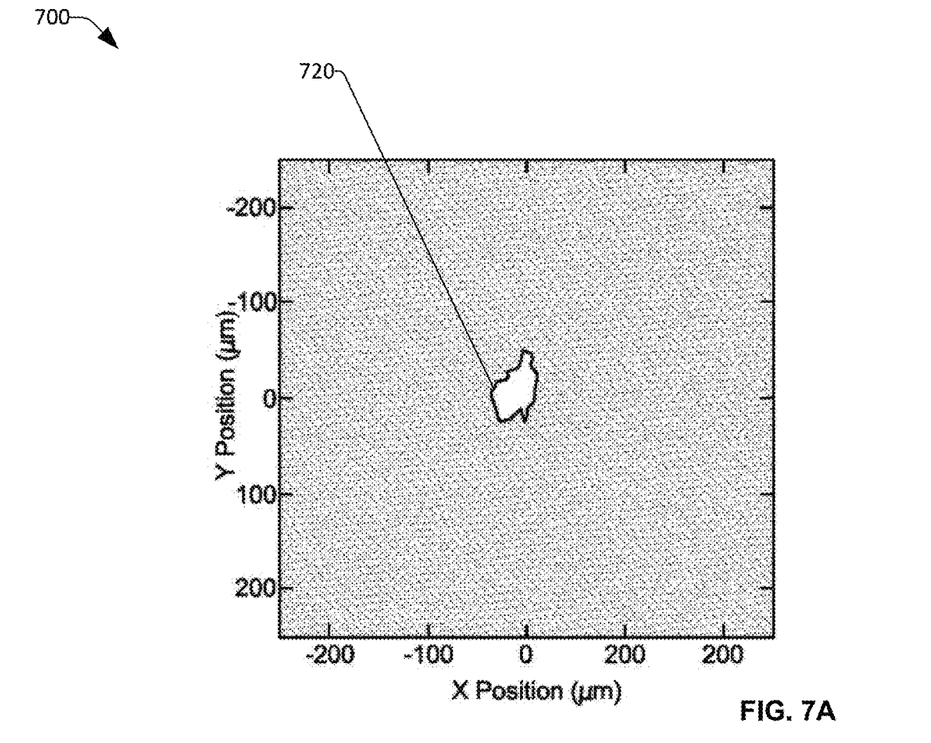
FIG. 7A is an image formed at the light sensitive array from light scattered by a moderately conformal surface.
Figure 7B:
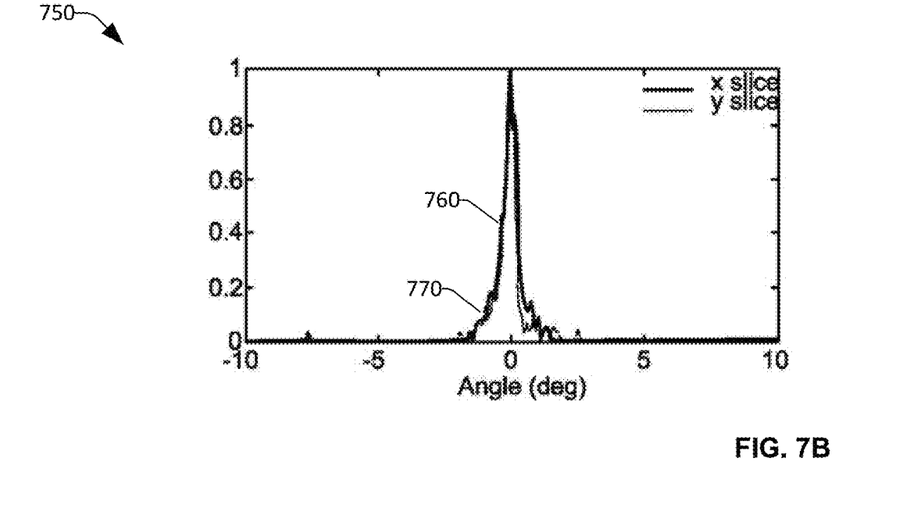
FIG. 7B is a plot of angular distribution of light for an image formed at the light sensitive array from light scattered by a moderately conformal surface

FIG. 7A illustrates an image 700 generated for a sample wherein the surface (e.g., surface 320) has a degree of non-conformality between the flakes (e.g., flakes 121), per the increased distribution of pixels in illuminated region 720 being illuminated in FIG. 7A compared with the illuminated region 620. As shown in FIG. 7B, plot 750, analysis of the intensity distribution in both the x direction (plot 760) and the y direction (plot 770) of the pixels in illuminated region 720 indicates an angle of tip and/or tilt of the flakes of about ±1.5°.

Figure 8A:
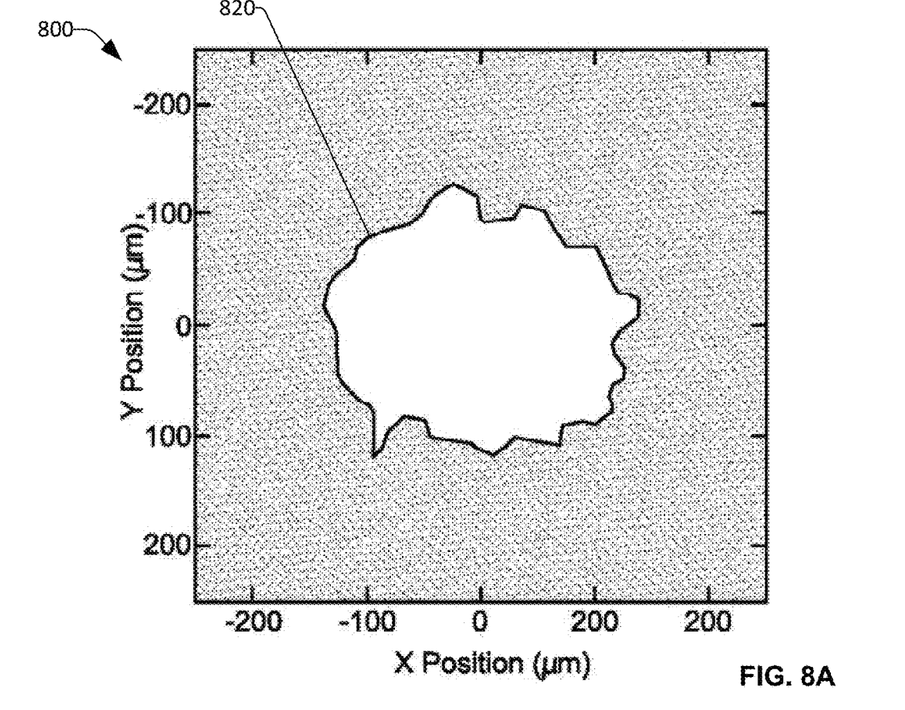
FIG. 8A is an image formed at the light sensitive array from light scattered by a non-conformal surface.
Figure 8B:
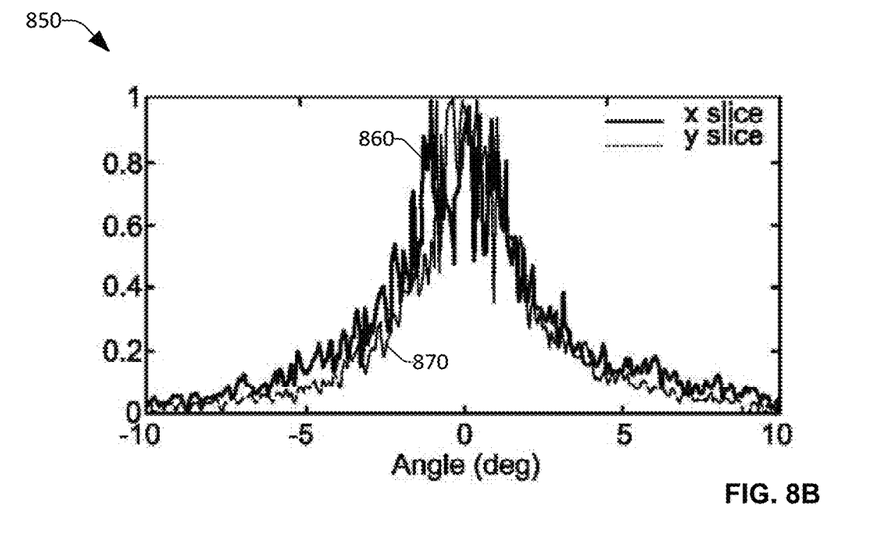
FIG. 8B is a plot of angular distribution of light for an image formed at the light sensitive array from light scattered by a non-conformal surface.

FIG. 8A illustrates an image 800 generated for a sample wherein the surface (e.g., surface 420) has a greater degree of non-conformality between the flakes (e.g., flakes 121), per the increased distribution of pixels in region 820 being illuminated in FIG. 8A compared with the illuminated regions 620 and 720. As shown in FIG. 8B, plot 850, analysis of the intensity distribution in both the x direction (plot 860) and the y direction (plot 870) of the pixels in illuminated region 820 indicates an angle of tip and/or tilt of at least about ±50°.

Figure 9:
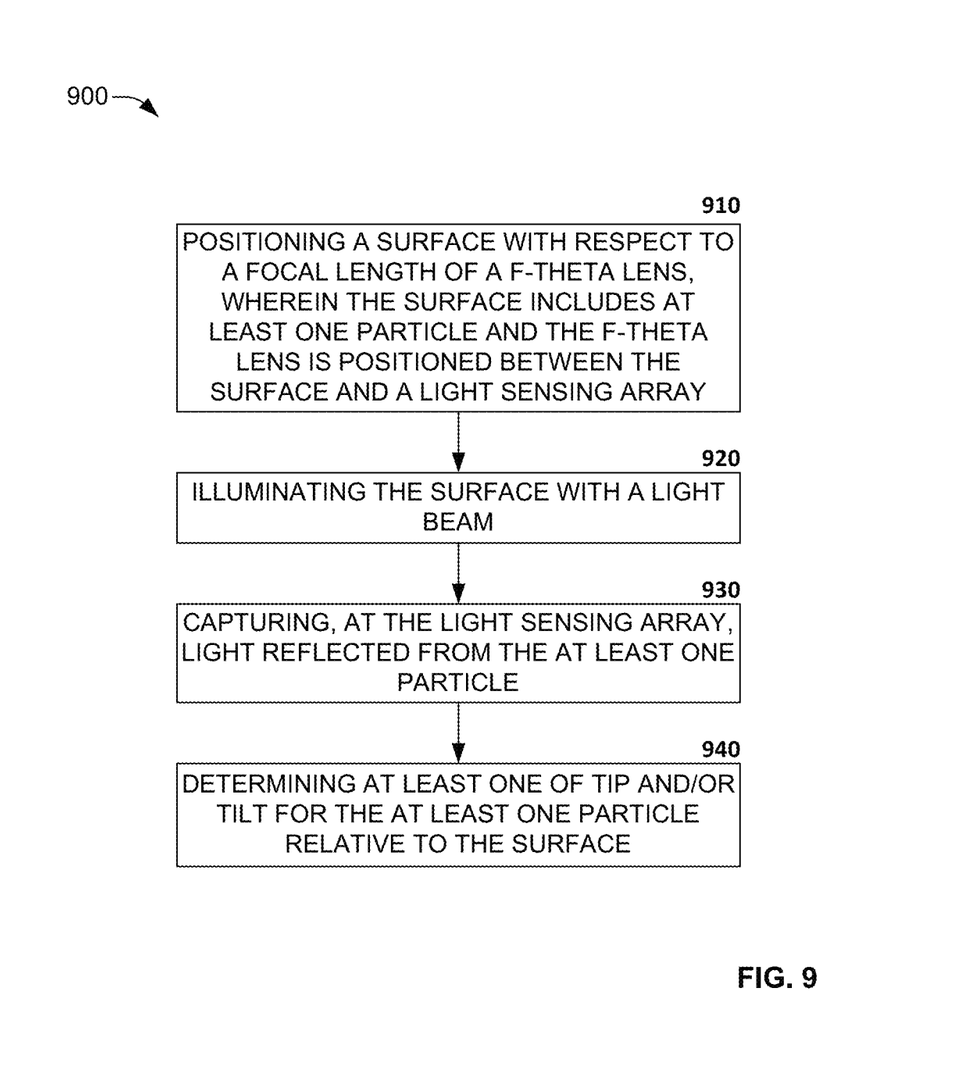
FIG. 9 is a flow diagram for determining surface roughness based upon an optical Fourier transform.

FIG. 9 illustrates an exemplary methodology relating to quantifying a surface roughness. While the methodology is shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement the methodology described herein.

FIG. 9 illustrates a methodology 900 relating to utilizing a light beam in conjunction with an optical Fourier transform to examine and quantify a roughness (e.g., full field roughness) of a surface. At 910, a surface of a target can be positioned with regard to a focal length of a lens, wherein, in an embodiment, the lens is a f-theta lens. The f-theta lens can optically perform a Fourier transform over light incident upon the lens. Further, the target surface can have at least one particle adhered thereto, wherein, in an embodiment, it is desired that the at least one particle is positioned to be in alignment with the surface plane of the target (e.g., the at least one particle is desired to be conformal with the surface plane).

At 920, the surface of the target can be illuminated with a light beam. In an embodiment, the light beam can be generated by a light source having high collimation, e.g., a laser. Further, a single mode fiber can be included in a path of the light beam to further collimate the light.

At 930, the light reflected from the surface and collected at the lens can be focused upon a LSA. The LSA can comprise a plurality of light sensitive pixels, and intensity values can be read from the pixels for form an image that comprises image pixels.

At 940, a determination can be made with regard to a degree of light distribution and intensity across the plurality of pixels forming the LSA. In an embodiment, where the at least one particle is conformally aligned with the target surface, after passing through the lens, the scattered light will be focused to a spot having a high intensity of light distributed (e.g., focused) over a small number of pixels in the plurality of pixels. In an embodiment where the at least one particle is not conformally aligned with the target surface, e.g., the at least one particle has a degree of tip and/or tilt, the scattered light, upon passing through the lens is incident upon the LSA with a large number of pixels being illuminated by the scattered light.

What has been described above includes examples of one or more embodiments. It is, of course, not possible to describe every conceivable modification and alteration of the above structures or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A method, comprising:
    directing light onto a surface, wherein the surface has a plurality of reflective flakes applied thereto;
    forming an image of the surface that has the plurality of reflective flakes applied thereto based upon light reflected from the reflective flakes and captured by a light sensitive array (LSA), wherein subsequent to the light being reflected from the reflective flakes, the light passes through an f-theta lens that is configured to optically perform a Fourier transform over the light reflected from the reflective flakes, the f-theta lens focuses the reflected light onto the LSA; and
    outputting a value that is indicative of roughness of the surface that has the plurality of reflective flakes applied thereto based upon intensity values of pixels of the image.

2. The method of claim 1, wherein the light is collimated light.

3. The method of claim 2, wherein the light is generated by a laser.

4. The method of claim 3, wherein the laser is a helium neon (HeNe) laser.

5. The method of claim 1, further comprising:
    identifying a region in the image where the reflected light is incident on the LSA; and
    computing the value that is indicative of the roughness across the entirety of the surface based upon at least one parameter of the region.

6. The method of claim 5, the at least one parameter comprises a number of pixels in the region.

7. The method of claim 5, the at least one parameter comprises intensity values of pixels in the region.

8. A system comprising:
    a light source configured to emit light;
    a light sensitive array (LSA) that is configured to form an image of a surface to which a plurality of reflective flakes are adhered; and
    a f-theta lens in optical communication with the light source and the LSA, the f-theta lens positioned relative to the light source to receive the light emitted by the light source subsequent to the light being reflected by the plurality of reflective flakes adhered to the surface, wherein the f-theta lens is configured to optically perform a Fourier transform over the light that is reflected by the plurality of reflective flakes, the f-theta lens positioned relative to the LSA to focus the light reflected by the surface towards the LSA, the LSA forms the image based upon the reflected light received from the f-theta lens, wherein intensity values of pixels of the image are indicative of a parameter of roughness of the surface that has the plurality of reflective flakes adhered thereto.

9. The system of claim 8, further comprising an image analyzer in communication with the LSA, the image analyzer configured to compute a value that is indicative of the parameter of roughness across the entirety of the surface based upon the intensity values of the pixels in the image.

10. The system of claim 9, the image analyzer is configured to identify a region in the image that corresponds to where the reflected light is incident upon the LSA, the image analyzer computes the value based upon the identified region in the image.

11. The system of claim 10, the image analyzer is configured to output the value based upon a distribution of intensity values of pixels in the identified region.

12. The system of claim 11, the value being indicative of distribution of at least one of tip or tilt, relative to the surface, of the flakes that are adhered to the surface.

13. The system of claim 8, wherein the light source is a laser.

14. The system of claim 13, wherein the laser is a HeNe laser.

15. The system of claim 8, further comprising a collimating lens that is optically coupled to the light source, the collimating lens positioned between the light source and the surface.

16. The system of claim 8, further comprising a single mode fiber, wherein the single mode fiber is located between the light source and the surface, and is configured to collimate the light emitted by the light source.

17. A system comprising:
    means for emitting light;
    means for forming an image, the means for forming the image comprises a focal plane array;
    means for focusing the light towards the focal plane array subsequent to the light reflecting off of a plurality of reflective flakes adhered to a surface, the means for focusing the light comprises an f-theta lens that is configured to perform an optical Fourier transform over the light that has reflected off of the plurality of reflected flakes, the image generated by the means for forming the image represents distribution and intensity of the light over a segment of the focal plane array; and means for outputting a value based upon the image, the value is indicative of a parameter of roughness of the surface that has the plurality of reflective flakes adhered thereto.

18. The system of claim 17, wherein the value is indicative of a distribution of degrees of at least one of tip or tilt, relative to a plane of the surface, of the plurality of reflective flakes adhered to the surface.

* * * * *